United States Patent
Justiss

(10) Patent No.: US 7,447,852 B1
(45) Date of Patent: Nov. 4, 2008

(54) SYSTEM AND METHOD FOR MESSAGE AND ERROR REPORTING FOR MULTIPLE CONCURRENT EXTENDED COPY COMMANDS TO A SINGLE DESTINATION DEVICE

(75) Inventor: Steven A. Justiss, Lakeway, TX (US)

(73) Assignee: Crossroads Systems, Inc., Austin, TX (US)

( * ) Notice: Subject to any disclaimer, the term of this patent is extended or adjusted under 35 U.S.C. 154(b) by 316 days.

(21) Appl. No.: 11/020,971

(22) Filed: Dec. 22, 2004

Related U.S. Application Data

(63) Continuation-in-part of application No. 10/636,042, filed on Aug. 7, 2003.

(51) Int. Cl.
G06F 3/06 (2006.01)
G06F 12/00 (2006.01)
G06F 13/00 (2006.01)
G06F 13/28 (2006.01)

(52) U.S. Cl. .......................... 711/161; 711/4; 711/100; 711/162

(58) Field of Classification Search ................... None
See application file for complete search history.

(56) References Cited

U.S. PATENT DOCUMENTS

| | | | |
|---|---|---|---|
| 5,515,502 A | 5/1996 | Wood | |
| 5,576,903 A | 11/1996 | Brown et al. | |
| 5,950,218 A | 9/1999 | Howard | |
| 5,974,563 A | 10/1999 | Beeler, Jr. | |
| 6,038,613 A | 3/2000 | Garcia et al. | |
| 6,049,848 A | 4/2000 | Yates et al. | |
| 6,058,389 A | 5/2000 | Chandra et al. | |
| 6,076,148 A | 6/2000 | Kedem | |
| 6,219,770 B1 | 4/2001 | Landau | |
| 6,397,309 B2 | 5/2002 | Kedem et al. | |
| 6,400,730 B1 | 6/2002 | Latif et al. | |
| 6,415,296 B1 | 7/2002 | Challener et al. | |
| 6,460,113 B1 | 10/2002 | Schubert et al. | |
| 6,487,644 B1 | 11/2002 | Huebsch et al. | |
| 6,505,216 B1 | 1/2003 | Schutzman et al. | |
| 6,532,124 B1 | 3/2003 | Abe | |
| 6,622,142 B1 | 9/2003 | Murray et al. | |
| 6,675,257 B1 | 1/2004 | Khalid et al. | |
| 6,704,836 B1 * | 3/2004 | Griswold et al. | ............ 711/113 |
| 6,757,794 B2 | 6/2004 | Cabrera et al. | |

(Continued)

OTHER PUBLICATIONS

Wilson, Steve, Extended Copy Command, T10, Apr. 1999 Found at http://www.T10.org/, 34 pages.*

(Continued)

*Primary Examiner*—Hyung Sough
*Assistant Examiner*—Gary W Cygiel
(74) *Attorney, Agent, or Firm*—Sprinkle IP Law Group

(57) ABSTRACT

One embodiment of the present invention can include a method for message and error reporting for multiple extended copy commands that comprises receiving a message from a destination device that is the destination device for at least two concurrent extended copy commands, determining the at least two concurrent extended copy commands that specify the destination device, determining an associated host for each of the at least two extended copy commands and for each of the at least two concurrent extended copy commands, propagating the message to the host associated with that extended copy command.

25 Claims, 7 Drawing Sheets

U.S. PATENT DOCUMENTS

| | | | |
|---|---|---|---|
| 6,892,199 | B2 | 5/2005 | Hong et al. |
| 6,922,761 | B2 | 7/2005 | O'Connell et al. |
| 6,931,501 | B1 | 8/2005 | Narayanaswamy et al. |
| 6,973,455 | B1 | 12/2005 | Vahalia et al. |
| 7,051,173 | B2 | 5/2006 | Tsuchiya et al. |
| 2001/0042222 | A1 | 11/2001 | Kedem |
| 2002/0004857 | A1 | 1/2002 | Arakawa |
| 2002/0042866 | A1 | 4/2002 | Grant |
| 2002/0083281 | A1 | 6/2002 | Carteau |
| 2002/0144069 | A1 | 10/2002 | Arakawa |
| 2002/0146035 | A1 | 10/2002 | Tyndall |
| 2002/0156942 | A1 | 10/2002 | Tyndall |
| 2002/0184463 | A1 | 12/2002 | Arakawa |
| 2002/0188697 | A1 | 12/2002 | O'Connor |
| 2002/0199073 | A1 | 12/2002 | Tamura |
| 2003/0014433 | A1 | 1/2003 | Teloh |
| 2003/0014534 | A1 | 1/2003 | Watanabe |
| 2003/0018657 | A1 | 1/2003 | Monday |
| 2003/0212700 | A1 * | 11/2003 | Basham ................ 707/102 |
| 2004/0107226 | A1 | 6/2004 | Autrey et al. |
| 2004/0148283 | A1 | 7/2004 | Harris et al. |
| 2004/0236868 | A1 | 11/2004 | Martin et al. |
| 2004/0243736 | A1 | 12/2004 | Hattrup et al. |
| 2005/0076264 | A1 | 4/2005 | Rowan et al. |
| 2005/0165868 | A1 | 7/2005 | Prakash |
| 2005/0172093 | A1 | 8/2005 | Jain |

OTHER PUBLICATIONS

Exabyte Corporation, Why Choose Native Fibre Backup?, Jul. 2001.
ATTO Technology Inc., Intelligent Bridging Architecture, Jun. 2002.
U.S. Patent Office Official Action issued Jul. 13, 2007 in U.S. Appl. No. 11/020,960, Justiss et al.

* cited by examiner

SYSTEM AND METHOD FOR MESSAGE AND ERROR REPORTING FOR MULTIPLE CONCURRENT EXTENDED COPY COMMANDS TO A SINGLE DESTINATION DEVICE

RELATED INFORMATION

This application is a continuation-in-part of, and claims benefit under 35 U.S.C. §120 to U.S. patent application Ser. No. 10/636,042 entitled "System and Method for Manipulating and Reporting a Log of Multi-Threaded Backups" by Justiss and Sims, filed Aug. 7, 2003, and is related to U.S. patent application Ser. No. 11/020,960 entitled "System and Method for Processing Multiple Concurrent Extended Copy Commands to a Single Destination Device", by Justiss, filed Dec. 22, 2004 which is hereby fully incorporated by reference herein.

TECHNICAL FIELD OF THE INVENTION

Embodiments of the invention relate generally to storage and retrieval of data and more particularly to systems and methods for reporting messages for multiple concurrent extended copy commands.

BACKGROUND

Businesses, governmental organizations and other entities are increasingly saving large volumes of data necessary for daily operations. In order to provide proper protection of data for business and legal purposes (e.g., to ensure quick recovery of data in the event of a disaster or to comply with document retention requirements), entities often back up data to a physical media, such as magnetic tapes, on a regular basis. Traditional backup systems placed an application server, backup server, source device, destination device and a local area network ("LAN") in the data path of backup operations. Under these systems, the LANs were becoming overburdened by the amount of data being copied and often the backup window was too short to achieve a complete backup of data. Many entities have now implemented Storage Area Networks ("SAN") to relieve much of the burden of mass data storage and backup from the LAN, freeing the LAN for more immediate data storage and manipulation operations.

Many SANs utilize a Fibre Channel-to-SCSI architecture in which SCSI storage devices are connected to Fibre Channel-to-SCSI routers. This allows data to be transferred across the SAN with the speed of Fibre Channel while using well defined SCSI commands. The T10/99-143r1, "Working Draft SCSI Extended Copy Command" (the "99-143r1 Draft") and NCITS T10 SPC-2 (SCSI Primary Commands-2) ("SPC-2") provide a mechanism for computer backup application to delegate actual data movement to third party devices known as "copy manager devices" or "data mover devices".

The copy manager devices move data from source devices to destination devices as designated by the backup application in "segment descriptors" which in part constitute the parameter list of an extended copy command. The SPC-2 standard contemplates that a copy manager device may process some number of concurrent extended copy commands that specify different destination devices.

The extended copy command is often used to backup data from random access devices, such as hard drives, to sequential access devices, such as tape drives. When the backup medium is a tape, the copy manager device strives to keep the tape moving by streaming data to the tape in order to maximize performance. To keep the drive streaming, copy manager devices often use some form of disk data pre-fetch, or "read ahead," so that the copy manager has enough data in its memory to build the next tape write command when an active tape write command completes.

With the advent of new, higher-speed, tape drives, copy manager devices have difficulty pre-fetching enough data from source devices to effectively keep the tape drive streaming. This reduces the efficiency of backup operations and can create data gaps on a tape.

SUMMARY OF THE INVENTION

Embodiments of the present invention provide a system and method of message reporting for extended copy commands that eliminates, or at least substantially reduces, the shortcomings of prior art systems and methods for dealing with messages related to extended copy commands.

One embodiment of the present invention can include a method for reporting messages for multiple extended copy commands that comprises receiving a message from a destination device that is the destination device for at least two concurrent extended copy commands, determining the at least two concurrent extended copy commands that specify the destination device, determining an associated host for each of the at least two extended copy commands and, for each of the at least two concurrent extended copy commands, propagating the message to the host associated with each extended copy command.

Another embodiment of the present invention can comprise a computer program product comprising a set of computer instructions stored on a computer readable medium. The set of computer instructions can comprise instructions executable to receive a message from a destination device that is the destination device for at least two concurrent extended copy commands, determine the at least two concurrent extended copy commands that specify the destination device, determine an associated host for each of the at least two extended copy commands and for each of the at least two concurrent extended copy commands, propagate the message to the host associated with that extended copy command.

Another embodiment of the present invention can comprise a routing device for processing extended copy commands comprising, a first interface to connect to a first data transport medium, a second interface to connect to a second data transport medium, a set of buffers and a processing unit connected to the first interface, the second interface and the set of buffers. The processing unit can be operable to receive a message from a destination device that is the destination device for at least two concurrent extended copy commands, determine the at least two concurrent extended copy commands that specify the destination device, determine an associated host for each of the at least two extended copy commands and for each of the at least two concurrent extended copy commands, propagate the message to the host associated with that extended copy command.

Embodiments of the present invention provide an advantage over prior art systems and methods by allowing a host or hosts issuing multiple concurrent extended copy commands to the same destination device to receive messages from that destination device.

Embodiments of the present invention provide another advantage by preventing spill-over of a tape by informing a host or hosts issuing multiple concurrent extended copy commands to the same destination device of Early Warning notifications.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for processing messages from a destination device for multiple concurrent extended copy commands that specify the same destination device. A copy manager, according to one embodiment of the present invention, can concurrently process extended copy commands from one or more hosts that reference the same destination device. If the copy manager receives a message (e.g., an error message, status message or other message) that should be sent to the hosts, the copy manager can propagate (e.g., forward) the message to the host(s) for each extended copy command that references the destination device.

The copy manager, according to one embodiment, can propagate the message by determining all the extended copy commands (active and/or queued) received by the copy manager that reference the destination device and the associated hosts that issued the extended copy commands. The copy manager can then forward the message to the associated hosts. In propagating the message to the hosts, the copy manager can provide sufficient information to allow the host to determine the extended copy command to which a particular message received from the copy manager corresponds. If a single host issues multiple extended copy commands referencing the same destination device, that host may receive multiple copies of the message.

Figure 1:
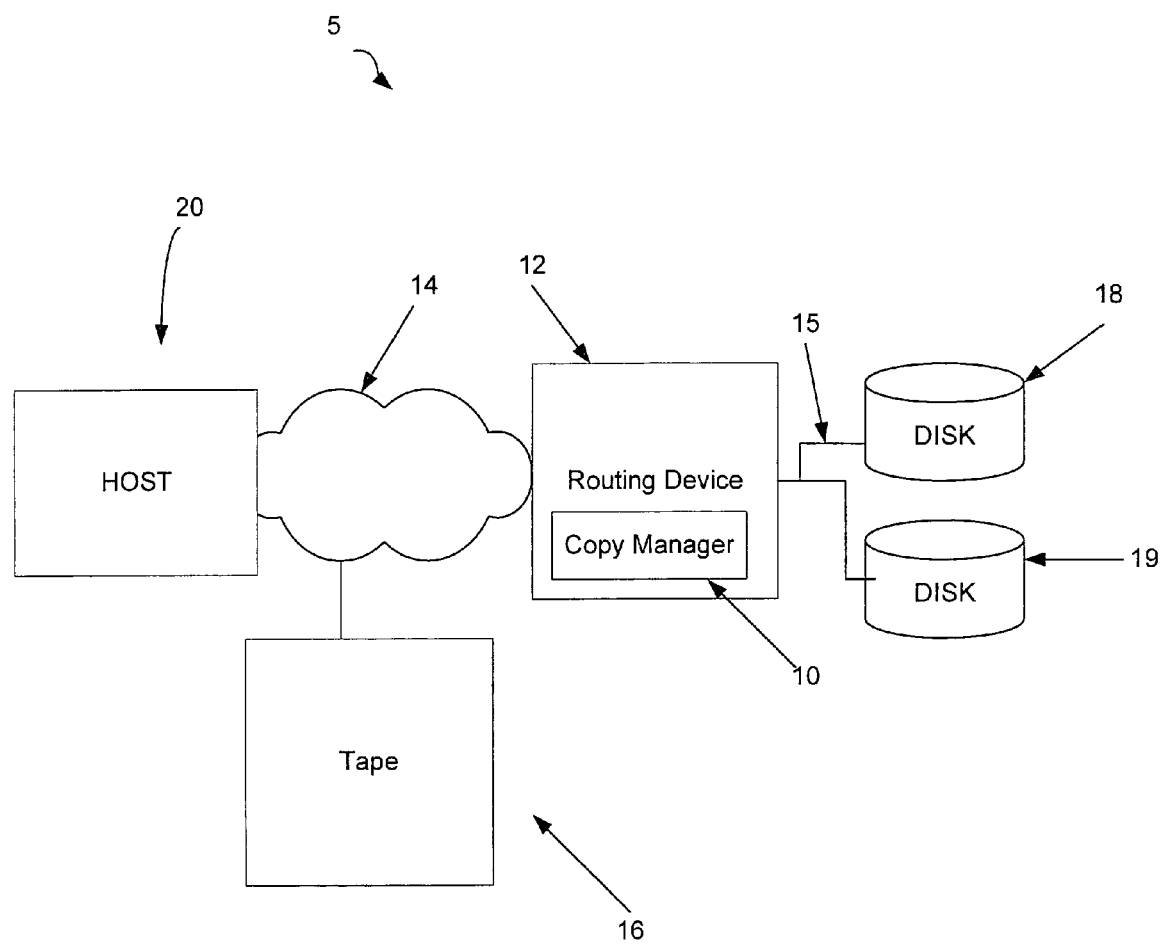
FIG. 1 is a diagrammatic representation of a system for carrying out an extended copy command according to one embodiment of the present invention.

FIG. 1 is a diagrammatic representation of a system 5 for carrying out an extended copy command according to one embodiment of the present invention. In this embodiment, a copy manager program 10 capable of processing an extended copy command can be located at a routing device 12, such as a storage router 12. For the sake of example, storage router 12 can be a fibre channel-to-SCSI router. However, it should be noted that copy manager program 10 can be located at any device in the command path capable of processing the extended copy command and is not limited to being implemented at routers. Moreover, it should be understood that the copy manager program 10 can be implemented in other routing devices including, but not limited to: Fibre Channel to Fibre Channel routers; SCSI to SCSI routers; iSCSI to iSCSI routers; Fibre Channel to iSCSI routers; iSCSI to Fibre Channel routers; iSCSI to SCSI routers; SCSI to iSCSI routers; Fibre Channel to Infiniband routers; Infiniband to Fibre Channel routers; iSCSI to advanced technology attachment ("ATA") routers; ATA to iSCSI routers; iSCSI to Serial ATA ("SATA") routers; Serial ATA to iSCSI routers; Fibre Channel to Serial Attached SCSI routers; Serial Attached SCSI to Fibre Channel routers; iSCSI to Serial Attached SCSI routers; Serial Attached SCSI to iSCSI routers; Fibre Channel to ATA routers; ATA to Fibre Channel routers; Fibre Channel to SATA routers; SATA to Fibre Channel routers; Fibre Channel to Serial SCSI Architecture routers; Serial SCSI Architecture to Fibre Channel routers; Infiniband to Serial Attached SCSI routers; Serial Attached SCSI to Infiniband routers and other routers, bridges, hubs, switches or other devices supporting protocols that use the extended copy command.

In the embodiment of FIG. 1, routing device 12 is coupled to a first storage device 16 (e.g., a tape drive 16, an optical storage device, a hard drive or other storage device) and a host 20 by a fibre channel data transport medium 14 and to a second data storage device 18 (e.g., hard disk drive 18 or an other storage device) and a third storage device 19 (e.g., hard disk drive 19 or other storage device) by a second data transport medium (e.g., a SCSI data transport medium) 15. It should be noted that, although the embodiment described in detail herein uses a router coupled to tape and disk drives by SCSI and Fibre Channel interconnects, alternative embodiments may use SAN attached appliances other than routers, and they may use other types of interconnects, including SCSI, iSCSI, InfiniBand, ATA, SATA, serial attached SCSI or any other interconnect that allows transport of extended copy commands. Moreover, copy manager program 10 can be located at other third party copy devices, such as servers, switches, stand-alone third party copy devices or other network device and can transfer data between various storage devices including, but not limited to, optical drives, tape drives, hard drives, redundant arrays of independent disks ("RAID") devices and other devices known in the art.

Host 20 is capable of accessing the other components of the network via the corresponding Fibre Channel interconnects. Particularly, host 20 is capable of accessing router 12 to delegate to it the management of copy tasks involving other network components, such as tape drive 16 and hard disk drives 18 and 19. This can be accomplished through the use of extended copy commands issued by host 20 to router 12. Routing device 12 processes these extended copy commands, reading data from one of the network devices and writing (copying) the data to another one of the components.

The use of extended copy commands allows host 20 to use its own processing power on tasks other than the mere movement of data between network components. For example, it is possible for host 20 to back up hard disk drive 18 and hard disk drive 19 to tape drive 16 (a potentially lengthy process) by issuing one or more corresponding extended copy commands to router 12. Router 12 can then copy the backup data from the hard disk drives to the tape drive without the intervention of host 20. Similarly, host 20 can issue one or more extended copy commands to restore data from the tape drive 16 to the hard disk drive 18 and the hard disk drive 19. The restoration process can similarly take place without the intervention of host 20.

According to one embodiment of the present invention, host 20 can issue multiple concurrent extended copy commands to router 12 to transfer data from any number of storage devices to a single storage device. Host 20 can issue multiple extended copy commands (or multiple hosts can issue extended copy commands) to transfer data from several random access storage devices (e.g., hard drives) to a single streaming or sequential storage device (e.g., a tape drive or other sequential storage device).

According to one embodiment of the present invention, copy manager program 10 can concurrently process multiple extended copy commands that specify data transfer from multiple source devices to a single destination device. For example, copy manager program 10 can concurrently process an extended copy command specifying the transfer of data from hard disk drive 18 to tape drive 16 and an extended copy command specifying the transfer of data from hard disk drive 19 to tape drive 16. Copy manager program 10 can interleave the data received from hard disk drive 18 and hard disk drive 19 to produce a data stream to tape drive 16. Interleaving data from multiple sources can allow the copy manager to keep the sequential access device streaming even when the sequential access target device can receive data faster than the data can be written to that device from a single source device.

Figure 2:
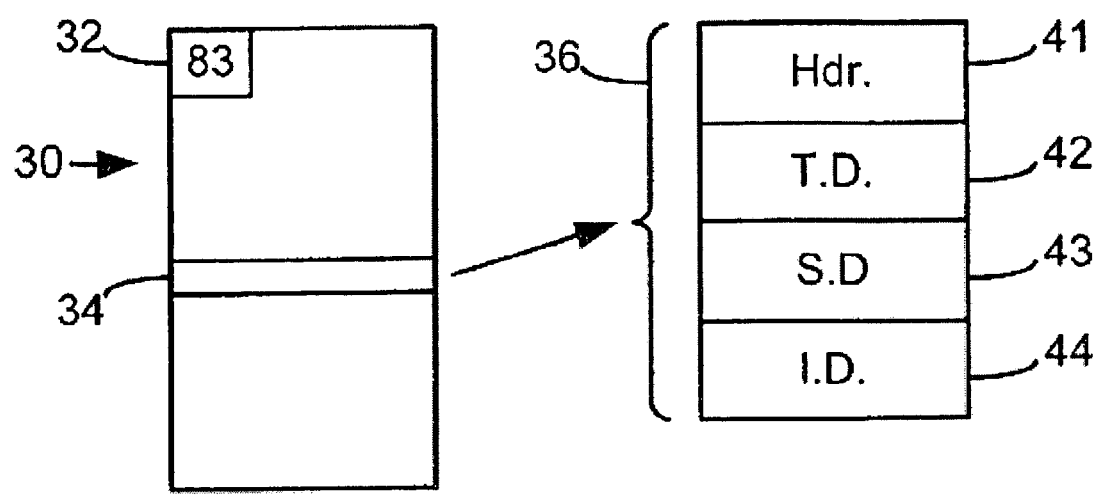
FIG. 2 provides a diagrammatic representation of an extended copy command.

FIG. 2 provides a diagrammatic representation of an extended copy command. As shown in the example of FIG. 2, extended copy command 30 has an opcode 32. In this instance, the opcode is a hexadecimal "83". The command format includes a field 34 that is a count of the size of a list 36 in the data. List 36 has a header 41, a set of target descriptors 42, a set of segment descriptors 43 and in-line data 44.

The target descriptors 42 describe the target devices that will be involved in the extended copy task. The target devices typically include the source device (i.e., the device from which data will be read) and the destination device (i.e., the device to which the data will be written). The destination and source devices can include the target devices listed for the extended copy command in the SPC-2 specification, 143r1 specification, or SPC-3 specification. The target device (source or destination) is typically a magnetic tape device, a magnetic disk device, an optical media device, or a write-once media ("WORM" device) as specified in the SPC-2 specification, but may be another storage device known in the art. A single extended copy command can specify data to be transferred from multiple sources to a destination. The host is typically a Solaris box, a Windows 2000 server; or other device capable of issuing an extended copy command. The source, destination and host devices may, however, be any of a number of different devices. The router or other box in which the present invention is implemented may also vary from one embodiment to another. These devices may have different characteristics, such as the maximum amount of memory that is (or may be) available for transferring data using extended copy commands.

The segment descriptors 43 describe the types of operations that will be performed, as well as the amount of data that will be transferred. For example, a segment descriptor may indicate that block data will be read from a hard disk drive and written to a tape drive (both of which are referenced by the target descriptors). The segment descriptors may describe backup operations, restore operations, block-to-block operations, or other data storage operations. Additionally, segment descriptors can specify metadata to be written to a destination device along with the data from the source device. In a block-to-stream operation, the metadata can be specified as "inline to stream" or "embedded to stream" as defined by the NCITS T10 SPC-2 Extended Copy Command specification. The preferred embodiment is an SPC-2 implementation that supports 8448 segment descriptors or a 99-143r1 Draft implementation that supports 512 segment descriptors. Each of the segment descriptors can move up to 32 MB of data. Thus, a very large amount of data may potentially be moved through a single extended copy command.

"Inline to stream" data, such as inline data 44, and "embedded to stream" data may or may not be present. Such data is provided by the host application to describe the data being backed up. This information may later be used, for example, to enable the backed up data to be restored from the tape to the disk. The SPC-2 standard also allows the use of embedded data segment descriptors to serve the same purpose as inline data segment descriptors.

Figure 3:
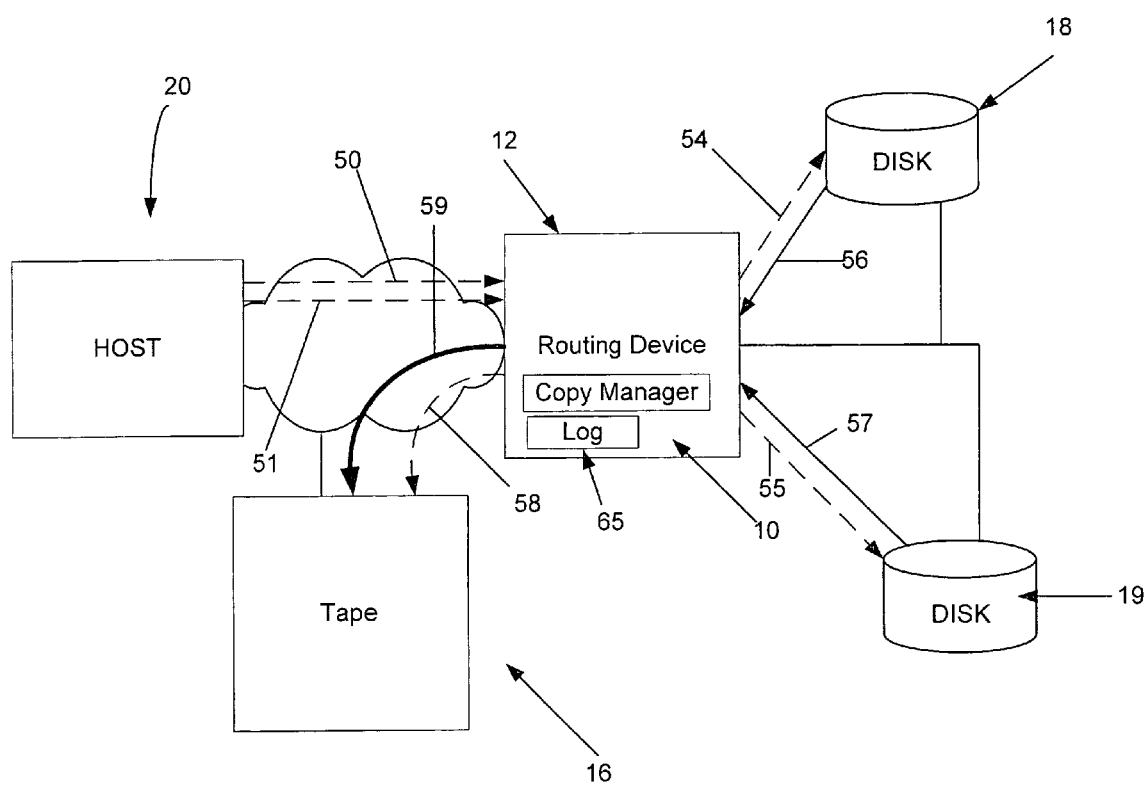
FIG. 3 is a diagrammatic representation of the flow of extended copy commands and corresponding data flows according to one embodiment of the present invention.

FIG. 3 is a diagrammatic representation of the flow of an extended copy command and corresponding data flow according to one embodiment of the present invention. FIG. 3 includes the example network structure shown in FIG. 1, and also includes lines depicting the flow of commands and data through the system during a backup operation that is performed using extended copy commands. Data flows 50 and 51 represent the issuance of extended copy commands from host 20. In this example, extended copy command 50 instructs the routing device 12 to transfer data from hard disk drive 18 to tape drive 16 and extended copy command 51 instructs routing device 12 to transfer data from hard disk drive 19 to tape drive 16.

When copy manager program 10 receives the extended copy command, routing device 12 can determine the source and destination device from the target descriptors. Copy manager program 10 can construct a Test Unit Ready ("tur") commands and send the "tur" commands to the source and destination devices to clear unit attentions. One embodiment of a method for clearing unit attentions that can be employed by copy manager program 10 is described in U.S. patent application Ser. No. 10/848,177, entitled "System and Method for Unit Attention Handling", filed May 18, 2004, to Tyndall, Justiss and Gao, which is hereby fully incorporated by reference herein.

Copy manager program 10 can send read commands (represented by data flow 54) to hard disk drive 18 and read commands (represented by data flow 55) to hard disk drive 19 and begin receiving data from the hard disk drive 18 and hard disk drive 19 (represented by data flows 56 and 57, respectively). Copy manager program 10 can further construct write commands and issue the write commands to tape drive 16 (represented by line 58) to write data received from hard drive 18 and hard drive 19 to tape drive 16 (represented by dataflow 59). According to one embodiment of the present invention, the data written to tape drive 16 can include data that was received by copy manager program 10 from both hard drive 18 and hard drive 19.

In the example above, routing device 12 is only reading data from one source device for each extended copy command. However, an extended copy command can specify multiple source devices. Accordingly, for each extended copy command received, routing device 12 may issue read commands to more than one source device for each extended copy command.

According to one embodiment of the present invention, when the extended copy command is executed, copy manager program 10 identifies the target devices and goes through the segment descriptors sequentially. For each of the segment descriptors, the copy manager program builds corresponding read commands to be issued to the source device and write commands to be issued to the destination device. When these read and write commands are issued to the respective devices, they serve to transfer data from the source device to the destination device. There may be multiple read and/or write commands for each segment descriptor.

In some instances, data may not be written to the destination device at the same rate at which it is read from the source device. For example, data may be read from a disk in chunks of 256 kB and then be written to a tape in chunks of 64 kB. Internal buffers (e.g., 16 kB buffers) can be used to buffer data until the copy manager program is ready to send data to the destination device. According to other embodiments of the present invention, the destination device may be able to receive data faster than the data can be read from the source devices.

Copy manager program 10, according to one embodiment of the present invention, can concurrently execute multiple extended copy commands that have the same destination device specified. For each extended copy command, copy manager program 10 can issue read commands to the appropriate source devices and can queue the received data. Copy manager program 10 can then construct and issue write commands to the destination device to send data to that device. The data flow to the destination device can include data that was retrieved based on multiple extended copy commands interleaved together. According to one embodiment of the present invention, the copy manager program 10 can intermingle data from various sources by writing blocks of data to the destination device in the order they are received from the source devices, with each block of data written to destination device containing data corresponding to a particular extended copy command. These blocks of data may include some portion of metadata taken from Inline Data segment descriptors.

Generally, a set of data corresponding to a particular extended copy command is referred to as a thread, whether read from a single source device or multiple source devices. Thus, the data sent to the destination device can include intermingled data corresponding to multiple threads (i.e., to multiple extended copy commands). This situation should be distinguished from concurrent extended copy commands as referenced in the NCITS t10 SPC-2 Extended Copy Command specification in which "concurrent" extended copy commands are implemented to write threads to different destination tape drives.

Embodiments of generating a data flow to a destination device that includes intermingled data from multiple threads are described in U.S. patent application Ser. No. 10/636,042 entitled "System and Method for Manipulating and Reporting a Log of Multi-Threaded Backups" by Justiss and Sims, filed Aug. 7, 2003, and U.S. patent application Ser. No. 11/020,960 entitled "System and Method For Processing Multiple Concurrent Extended Copy Commands to a Single Destination Device" by Justiss, both of which are incorporated by reference herein.

From the destination device's perspective (e.g., destination device 16), the destination device only sees data being written from the copy manager and is not aware that the data flow contains data corresponding to multiple threads. Therefore, if the destination device (e.g., tape device 16) issues a message (such as an Early Warning notification), it will issue the message to the third party copy device (e.g., routing device 12). As described below, copy manager program 10 can propagate the message to a host or multiple hosts for each extended copy referencing the destination device.

According to one embodiment of the present invention, copy manager program 10 can maintain a log 65 of the extended copy commands being processed. Log 65 can, for example, include an identifier for the extended copy command, the host that issued the extended copy command and the destination device for the extended copy command. Log 65 can include both extended copy commands that are actively being processed and extended copy commands that are queued at routing device 12.

Table 1 illustrates one embodiment of a log 65 that can be maintained by copy manager program 10.

TABLE 1

| Host | Extended Copy Command | Destination |
|---|---|---|
| Host 1 | Command 1 | Tape 1 |
| Host 1 | Command 2 | Tape 1 |
| Host 2 | Command 3 | Tape 2 |
| Host 3 | Command 4 | Tape 2 |

Table 1 is provided by way of example only and log 65 can include any arbitrary identifiers for a particular extended copy command, host identifier and destination identifier. In the example of Table 1, "Host1" can issue two extended copy commands, represented by "Command1" and "Command2". This can, for example, represent the extended copy commands from host 20 to back up hard disk drive 18 and hard disk drive 19 to tape 16. Similarly, multiple hosts can issue extended copy commands to transfer data to the same destination device (e.g., "Host2" and "Host3", not shown, can issue extended copy commands to transfer data to "Tape2", not shown). Log 65 can be maintained as a file, a database record, a lookup table or according to any data storage scheme known in the art. It should be further understood that copy manager program 10 can associate hosts, destination devices and particular extended copy commands according to any suitable programming scheme as would be understood by those in the art.

When routing device 12 receives a message from a destination device, copy manager program 10 can consult log 65 to determine the active and/or queued extended copy commands that reference that destination device and, for each extended copy command, propagate the message to the associated host. Using the example of Table 1, if "Tape1" (e.g., tape drive 16) generates an Early Warning notification to notify a host that the end of a tape is near, copy manager program 10 can consult log 65 to determine that "Host1" (e.g., host 20) has two extended copy commands active that reference "Tape1". Copy manager program 10 can then propagate the Early Warning notification to host 20 for each extended copy command. Thus, copy manager program 10 can send two Early Warning notifications to host 20, one for each extended copy command. In propagating the Early Warning notification to host 20, copy manager program 10 can include information sufficient for host 20 to associate each Early Warning notification with the appropriate extended copy command.

As another example, if the "Tape2" destination device sends back an error notification, copy manager program 10 can determine that data is being sent to "Tape2" based on two extended copy commands (e.g., "Command3" from "Host2" and "Command4" from "Host3"). Copy manager program 10 can propagate the "Early Warning" notification to the associated hosts (e.g., "Host2" and "Host3").

Figure 4:
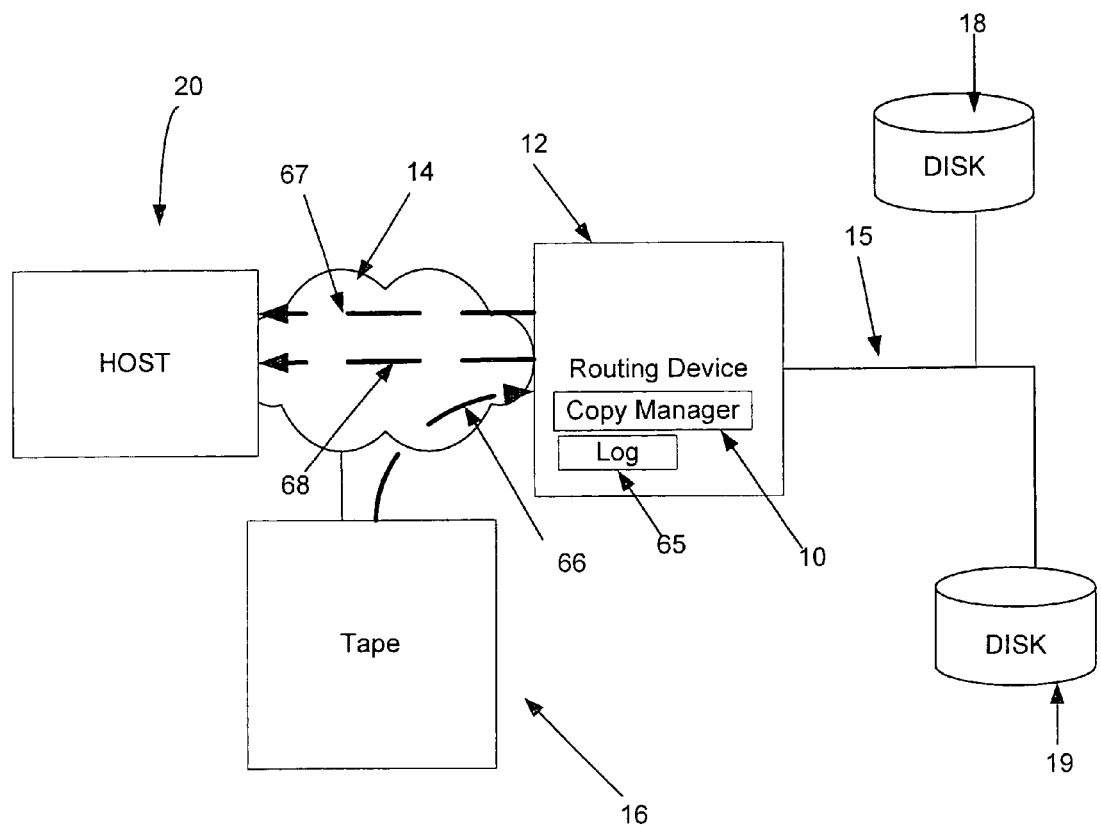
FIG. 4 is a diagrammatic representation of one embodiment of message reporting at a routing device.

FIG. 4 is a diagrammatic representation of one embodiment of error handling using the example embodiment of FIG. 3. Destination device 16 can issue an error message (represented at 66), such as an Early Warning Notification, to routing device 12. The Early Warning Notification indicates that the destination device is, for example, reaching the end of a tape. Copy manager program 10 can determine the active and/or queued extended copy commands that reference the destination device 16. Copy manager 10 can propagate the error message to the hosts associated with the extended copy commands that reference the destination device.

According to one embodiment of the present invention, copy manager program 10 can propagate the error message by generating a corresponding error message for each extended copy command that references the destination device, even if all the extended copy commands were received from the same host. For example, copy manager program 10 can send error message 67 and error message 68 to host 20 containing the Early Warning notification. Error message 67 and error message 68 can each contain sufficient information such that host 20 can identify to which extended copy command each error message corresponds (e.g., error message 67 corresponds to "Command1" of Table 1 and error message 68 corresponds to "Command2" of Table 1). Thus, error message 66 can be propagated for each extended copy command to the issuing host(s).

Figure 5:
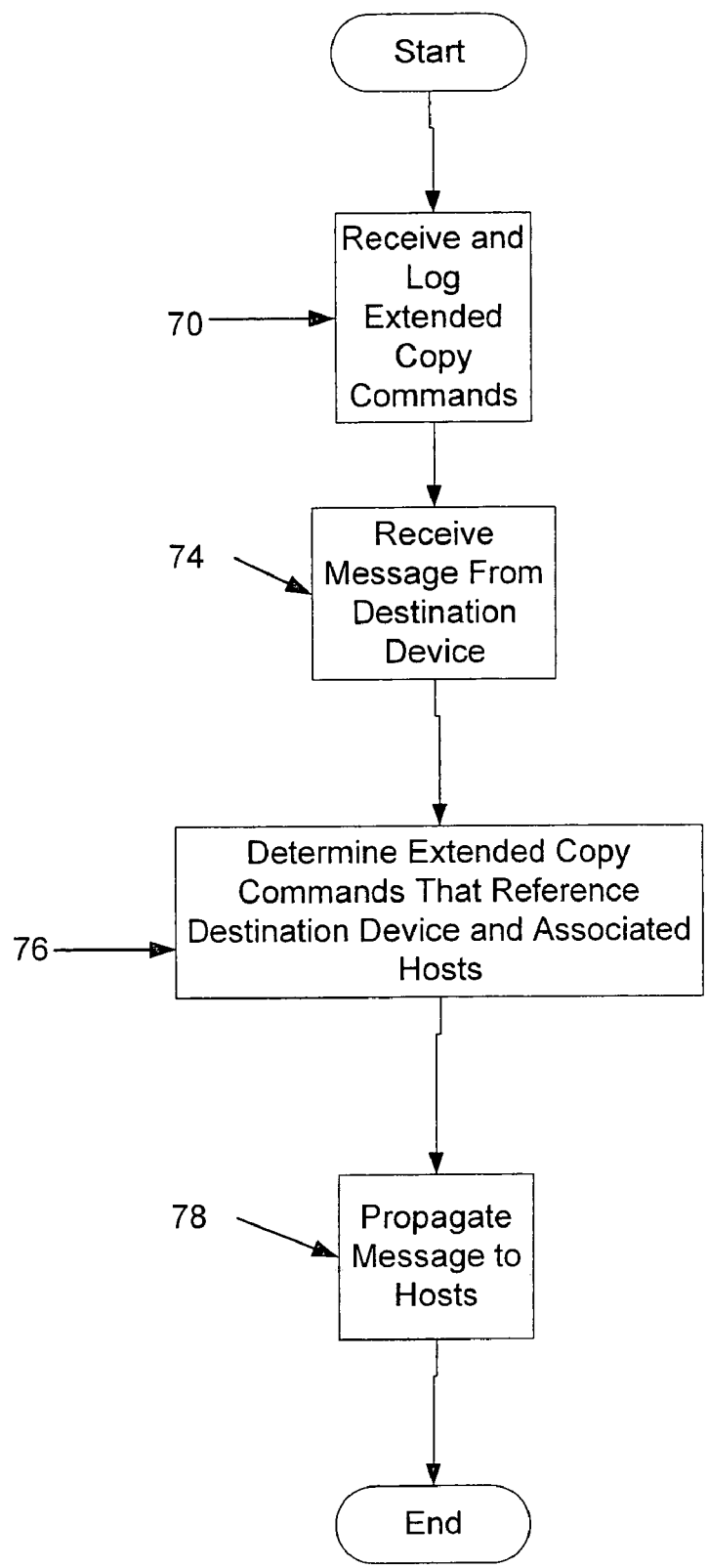
FIG. 5 is a flow chart illustrating one embodiment of message reporting according to the present invention.

FIG. 5 is a flow chart illustrating one embodiment of a method for error handling. The methodology of FIG. 5 can be implemented, for example, as a set of computer executable instructions (a "copy manager program") stored on a computer readable medium. At step 70, the copy manager program can receive multiple extended copy commands and log the extended copy commands, the host issuing each extended copy command and the destination device for each extended copy command.

At step 74, the copy manager program can receive a message, such as an "Early Warning" notification, from a destination device to which data from multiple threads is being written. In other words, the copy manager program can receive a message from a destination device that is the destination for at least two concurrent extended copy commands. At step 76, the copy manager program can determine the extended copy commands that reference the destination device and the associated host(s) for each of the extended copy commands that reference the destination device. In other words, the copy manager program can determine the extended copy commands that specify that data should be written to the destination device and the host(s) that issued those extended copy commands.

For each extended copy command that references the destination device from which the message was received, the copy manager program, at step 78, can propagate the message to the host associated with that extended copy command. According to one embodiment, if a single host issued multiple extended copy commands, the copy manager program can propagate the message multiple times to the host. Thus, for example, the copy manager program can send multiple Early Warning notifications to a single host that issued multiple extended copy commands referencing the same destination device.

In propagating the message from the destination device to the host(s) that issued the extended copy commands, the copy manager program can provide messages to the host that indicate the status of the destination device. Again, continuing with the previous example, if the copy manager returns two Early Warning notifications to the same host according to the SCSI protocol. The process of FIG. 5 can be arbitrarily repeated as needed or desired.

Figure 6A:
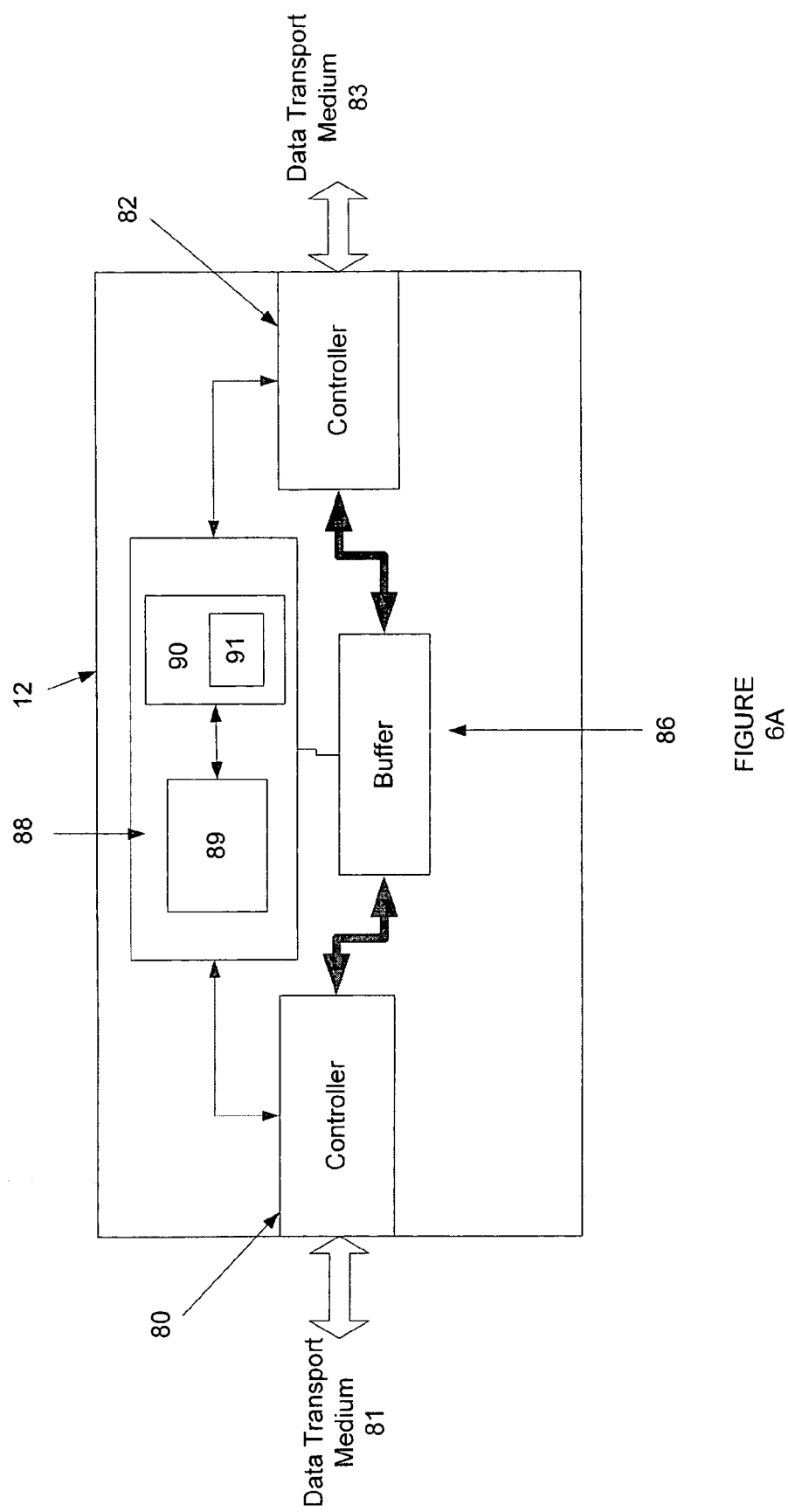
FIG. 6A is a diagrammatic representation of one embodiment of a routing device that can act as a copy manager device and FIG. 6B is a diagrammatic representation of a data flow at the routing device of FIG. 6A.

FIG. 6A is a diagrammatic representation of one embodiment of a routing device 12 in which multiple extended copy commands can be processed according to embodiments of the present invention. Routing device 12 can comprise a first transport medium controller 80 that interfaces with a first transport medium 81 and a second transport medium controller 82 that interfaces with a second transport medium 83. In one embodiment of the present invention, the first transport medium 81 can be a Fibre Channel transport medium, the second transport medium 83 a SCSI bus, controller 80 a Fibre Channel controller, such as a fibre channel controller based on the TACHYON family of fibre channel control chips and controller 82 a SCSI controller. TACHYON fibre channel control chips are a product of Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5400x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; Fibre Channel and Fibre Advanced Technology Attachment ("FATA"); SATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols. Additionally, the various transport media can carry commands according to a variety of command protocols including, but not limited to, SCSI-1, SCSI-2, SCSI-3, SPC-1 and SPC-2.

A set of buffers 86 provides memory work space and is connected to both controller 80 and to controller 82. Buffers 86 can queue data corresponding to extended copy commands. A processing unit 88 can be connected to controller 80, controller 82 and buffers 86. According to one embodiment of the present invention, processing unit 88 comprises one or more processors 89 for controlling operation of routing device 12, handling address mapping and security access and converting commands between protocols and a computer readable medium 90 accessible by the processor 89 storing a set of computer instructions 91 that are executable by the processor. Computer instructions 91 can include instructions to implement a copy manager program. According to other embodiments of the present invention buffers 86 and/or computer readable medium 91 can be onboard processor 89.

In one implementation (not shown), the routing device 12 can be a rack mount or free standing device with an internal power supply. Routing device 12 can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of routing device 12 can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration.

Further, this implementation includes a SCSI interface supporting Ultra-2 based on the SYMBIOS 53C8xx series SCSI controllers, and an operating system based upon the WIND RIVER SYSTEMS VXWORKS kernel. In addition, the routing device can include software as required to control functions of the various elements, convert commands and responses between command protocols and generate commands and provide appropriate translations between the FC and SCSI data transport protocols (and for other protocol if necessary for other embodiments).

Figure 6B:
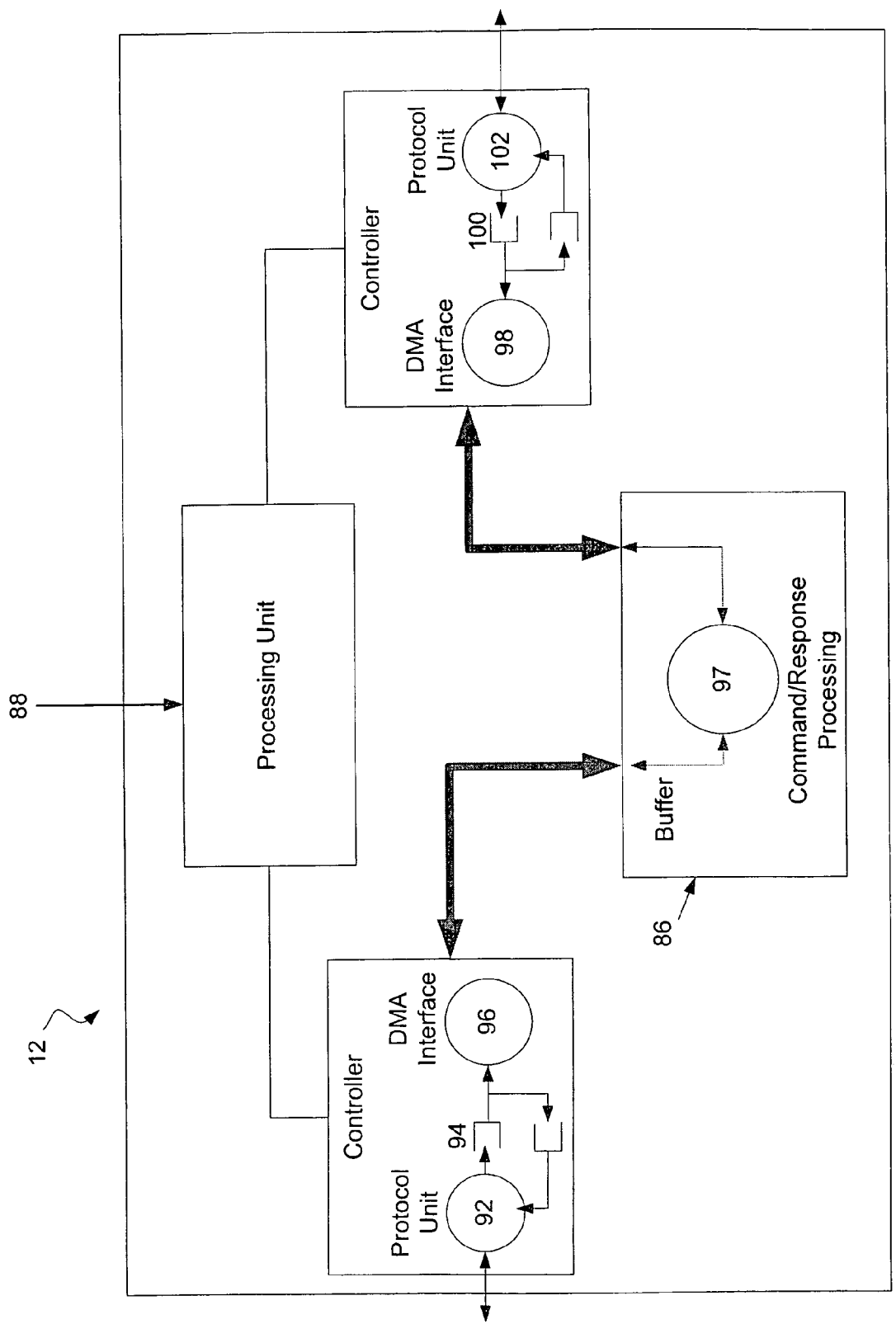

FIG. 6B is a block diagram of one embodiment of data flow within the routing device 12 of FIG. 6A. As shown, data from first transport medium 81 (e.g., the Fibre Channel transport medium) is processed by a protocol unit 92 (e.g., a Fibre Channel protocol unit) and placed in a FIFO queue 94. A direct memory access (DMA) interface 96 can then take data out of FIFO queue 94 and places it in buffers 86.

Processing unit 88 processes the data in buffer 86 as represented by processing 97. This processing can include mapping between the first data transport protocol and the second data transport protocol, mapping between command protocols, applying access controls, queuing data blocks in a FIFO queue and routing functions. A DMA interface 98 then pulls data from buffer 86 and places it into a buffer 100. A second protocol unit 102 pulls data from buffer 100 and communicates the data on the second transport medium 83 (e.g., the SCSI bus). Data flow in the reverse direction, from the second data transport medium 83 to the first data transport medium 81, can be accomplished in a reverse manner.

It should be noted that the example of the routing device of FIGS. 6A and 6B is provided by way of example. Embodiments of the present invention can be implemented in routing devices such as routers, bridges, hubs or other routing devices in the command path. Additionally, embodiments of the present invention can be implemented has hardware and/or software programming. Embodiments can be implemented as computer instructions stored on any computer readable medium known in the art (e.g., optical disk, magnetic disk, flash memory, RAM, ROM, EEPROM or other computer readable medium).

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A method for reporting messages for multiple extended copy commands comprising:
    maintaining a log of extended copy commands received at a routing device, destination devices specified by the extended copy commands and hosts associated with the extended copy commands;
    receiving a message from a destination device that is the destination device for at least two concurrent extended copy commands;
    consulting the log to determine the extended copy command to which the message corresponds;
    determining the at least two concurrent extended copy commands that specify the destination device;
    determining an associated host for each of the at least two extended copy commands;
    consulting the log to determine a host associated with the extended copy commands; and
    for each of the at least two concurrent extended copy commands, propagating the message to the host associated with that extended copy command.

2. The method of claim 1, wherein a single host is associated with each of the at least two concurrent copy commands.

3. The method of claim 2, wherein the message is propagated to the single host for each of the at least two extended copy commands.

4. The method of claim 1, wherein the message is an error message.

5. The method of claim 1, wherein the message is an early warning notification.

6. The method of claim 1, wherein multiple hosts are associated with the at least two extended copy commands.

7. The method of claim 6, wherein the message is propagated to multiple hosts.

8. The method of claim 7, wherein a copy manager program propagates the messages.

9. A computer program product comprising a set of computer instructions stored on a computer readable medium, wherein the set of computer instructions comprise instructions executable to:
    maintain a log of extended copy commands received at a routing device, destination devices specified by the extended copy commands and hosts associated with the extended copy commands;
    receive a message from a destination device that is the destination device for at least two concurrent extended copy commands;
    consult the log to determine the extended copy command to which the message corresponds;
    determine the at least two concurrent extended copy commands that specify the destination device;
    determine an associated host for each of the at least two extended copy commands;
    consult the log to determine a host associated with the extended copy commands; and
    for each of the at least two concurrent extended copy commands, propagate the message to the host associated with that extended copy command.

10. The computer program product of claim 9, wherein a single host is associated with each of the at least two concurrent copy commands.

11. The computer program product of claim 10, wherein the message is propagated to the single host for each of the at least two extended copy commands.

12. The computer program product of claim 9, wherein the message is an error message.

13. The computer program product of claim 9, wherein the message is an early warning notification.

14. The computer program product of claim 9, wherein multiple hosts are associated with the at least two extended copy commands.

15. The computer program product of claim 14, wherein the set of computer instructions further comprise instructions executable to propagate the message to multiple hosts.

16. A routing device for processing extended copy commands comprising:
    a first interface to connect to a first data transport medium;
    a second interface to connect to a second data transport medium;
    a set of buffers;
    a processing unit connected to the first interface, the second interface and the set of buffers, the processing unit operable to:

maintain a log of extended copy commands received at a routing device destination devices specified by the extended copy commands and hosts associated with the extended copy commands;

receive a message from a destination device that is the destination device for at least two concurrent extended copy commands;

consult the log to determine the extended copy command to which the message corresponds;

determine the at least two concurrent extended copy commands that specify the destination device;

determine an associated host for each of the at least two extended copy commands;

consult the log to determine a host associated with the extended copy commands; and for each of the at least two concurrent extended copy commands, propagate the message to the host associated with that extended copy command.

17. The routing device of claim 16, wherein a single host is associated with each of the at least two concurrent copy commands.

18. The routing device of claim 17, wherein the processing unit is operable to propagate the message to the single host for each of the at least two extended copy commands.

19. The routing device of claim 16, wherein the message is an error message.

20. The routing device of claim 16, wherein the message is an early warning notification.

21. The routing device of claim 16, wherein multiple hosts are associated with the at least two extended copy commands.

22. The routing device of claim 21, wherein the processing unit is further operable to propagate the message to multiple hosts.

23. The routing device of claim 16, wherein the first and second transport media operate according to the same data transport protocol.

24. The routing device of claim 16, wherein the first and second transport media are fibre channel transport media.

25. The routing device of claim 16, wherein the first and second transport media operate according to different data transport protocols.

* * * * *